(12) United States Patent
Rumsewicz

(10) Patent No.: US 6,532,214 B1
(45) Date of Patent: Mar. 11, 2003

(54) CONTROLLING TRAFFIC CONGESTION IN INTELLIGENT ELECTRONIC NETWORKS

(75) Inventor: Michael Peter Rumsewicz, Glen Iris (AU)

(73) Assignees: Ericsson Australia Pty Ltd., Broadmeadows (AU); Royal Melbourne Institute of Technology, Melbourne (AU); The University of Melbourne, Parkville (AU)

( * ) Notice: Subject to any disclaimer, the term of this patent is extended or adjusted under 35 U.S.C. 154(b) by 0 days.

(21) Appl. No.: 09/029,290

(22) PCT Filed: Sep. 6, 1996

(86) PCT No.: PCT/AU96/00562

§ 371 (c)(1),
(2), (4) Date: Jun. 18, 1998

(87) PCT Pub. No.: WO97/09814

PCT Pub. Date: Mar. 13, 1997

(30) Foreign Application Priority Data

Sep. 7, 1995 (AU) ............................................. PN5265

(51) Int. Cl.[7] ................................................. H04L 12/26
(52) U.S. Cl. ....................................... 370/236; 370/229
(58) Field of Search .............................. 370/229, 230, 370/230.1, 235, 236, 252, 465; 379/112.04, 221.09, 221.12, 229, 230

(56) References Cited

U.S. PATENT DOCUMENTS

| | | | | |
|---|---|---|---|---|
| 5,450,483 A | * | 9/1995 | Williams | ............... 379/112.04 |
| 5,457,687 A | | 10/1995 | Newman | |
| 5,550,914 A | * | 8/1996 | Clarke et al. | .......... 379/112.04 |
| 5,570,410 A | * | 10/1996 | Hooshiari | ............... 379/221.09 |
| 5,862,334 A | * | 1/1999 | Schwartz et al. | ........... 379/230 |

FOREIGN PATENT DOCUMENTS

| | | |
|---|---|---|
| AU | 34363 | 5/1996 |
| EP | 0 426 355 A2 | 5/1991 |
| EP | 0 448 049 A2 | 9/1991 |
| EP | 0 465 090 A1 | 1/1992 |
| EP | 0 647 081 A2 | 4/1995 |
| WO | WO 91/20148 | 12/1991 |
| WO | WO 93/20637 | 10/1993 |
| WO | WO 95/11557 | 4/1995 |
| WO | WO 95/14341 | 5/1995 |
| WO | WO 96/15634 | 5/1996 |
| WO | WO 96/19070 | 6/1996 |

OTHER PUBLICATIONS

Patent Abstracts of Japan, E–1314 p. 56, JP, A, 4–263554, Sep. 18, 1992.
R. L. Franks, et al. "UPT Traffic Issues—An Agenda for the 90's," 8th *ITC Specialist Seminar on Universal Personal Telecommunications*, Oct. 1992.
E. H. Lipper, et al., "Traffic Issues in Personal Communications Service," 8th *ITC Specialist Seminar on Universal Personal Telecommunications*, Oct. 1992.
Ulf Körner, "Overload Control of SPC Systems," *Proceedings of the 13th International Teletraffic Congress*, 1991.

* cited by examiner

Primary Examiner—Chau Nguyen
Assistant Examiner—D. Trinh
(74) *Attorney, Agent, or Firm*—Jenkens & Gilchrist, P.C.

(57) ABSTRACT

A method and apparatus for controlling traffic through at least one node in an intelligent telecommunications network such that congestion is controlled in a particular subsystem in which a sudden change in the traffic profile is determined. The moving average of the traffic profile for each subsystem at the node is continuously monitored. When congestion is detected, it is determined whether the congestion is caused by a sudden change in the traffic profile for a particular subsystem at the node. If it is determined that the congestion is caused by a sudden change in the traffic profile, then congestion controls are invoked to control congestion in the particular subsystem.

35 Claims, 15 Drawing Sheets

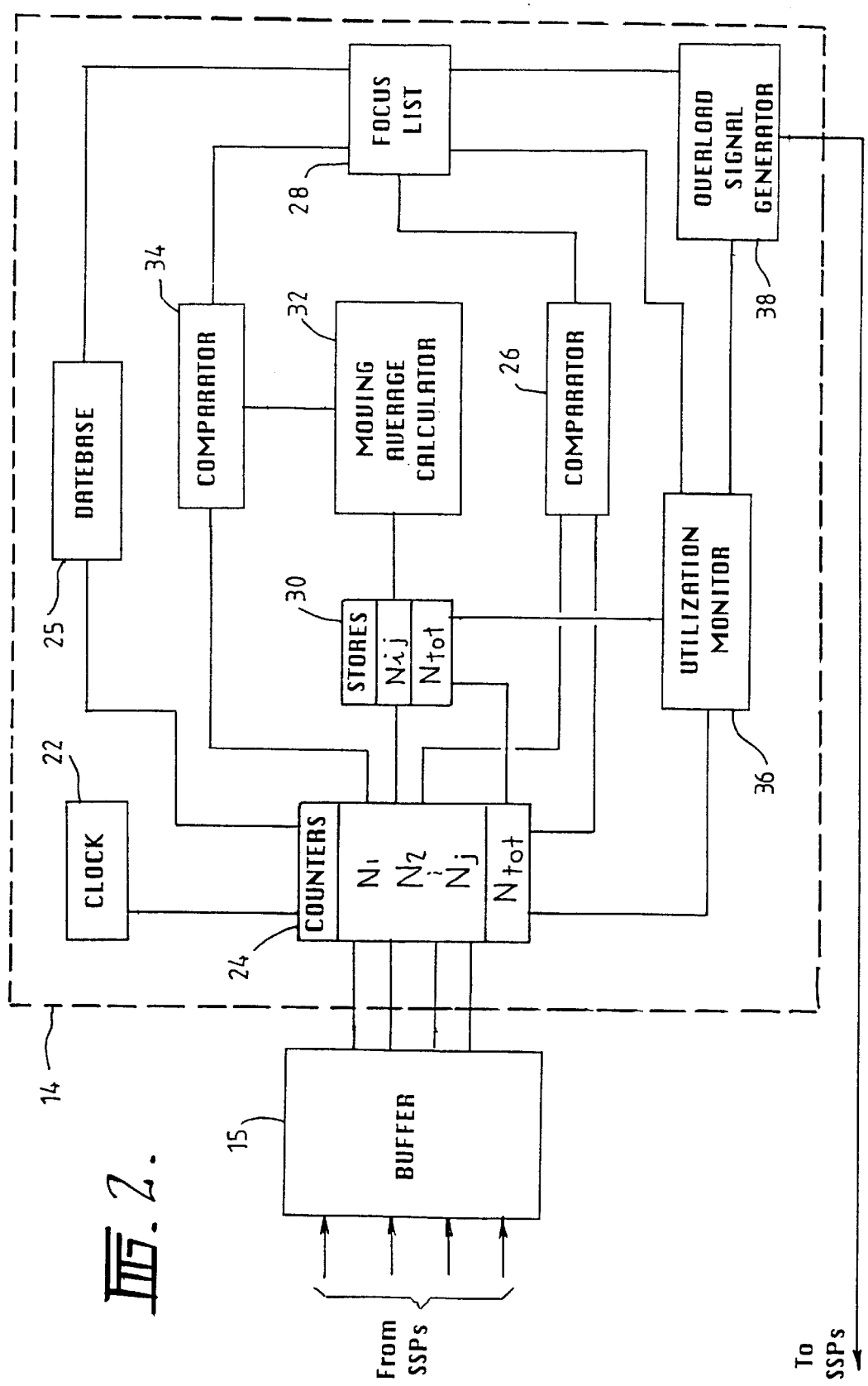

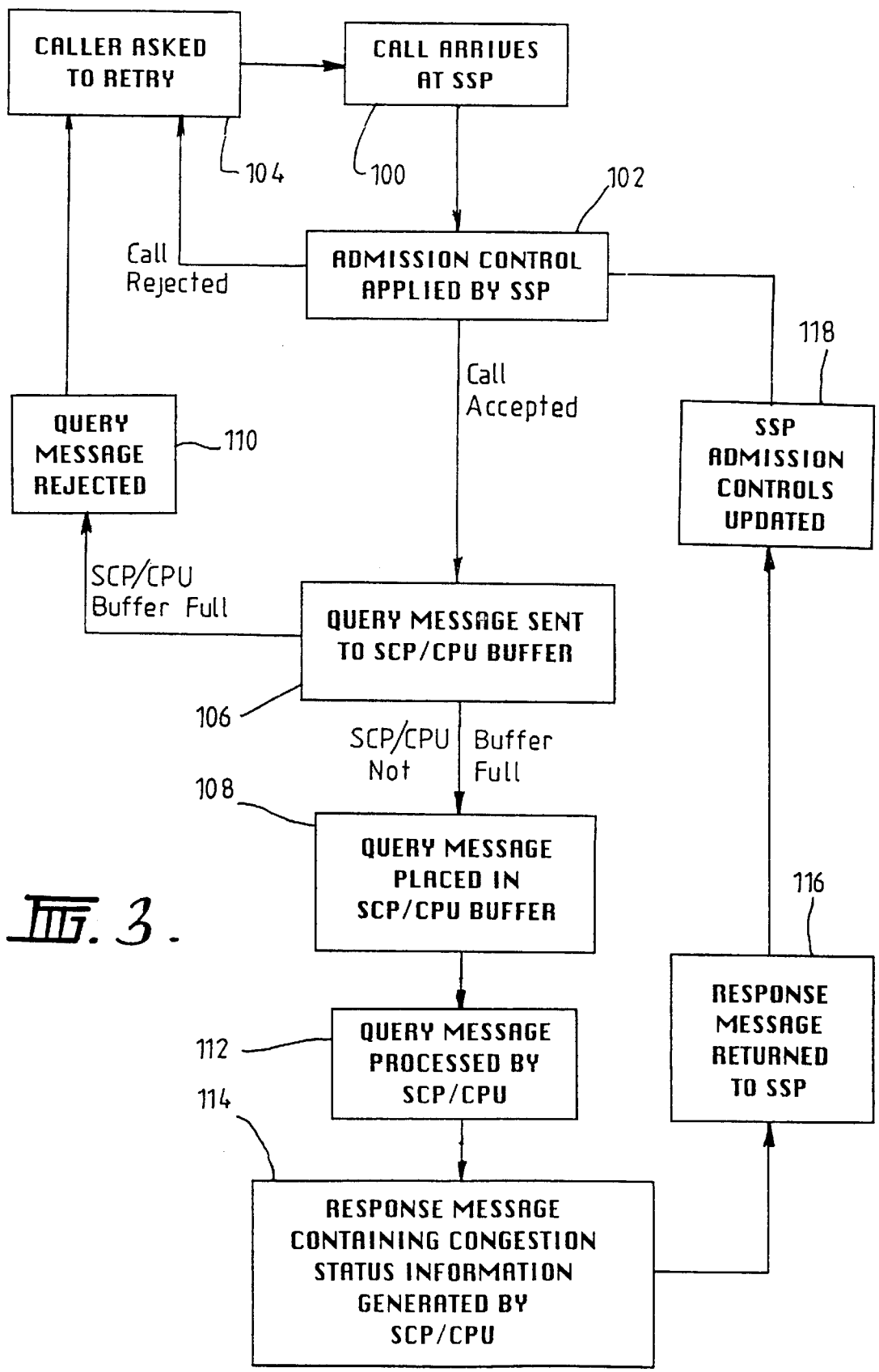

— CALL-IN TARGET
······ CLASS 1
---- CLASS 2
—·—·— CLASS 3

— CALL-IN TARGET
······· CLASS 1
--- CLASS 2
—··— CLASS 3

—— CALL-IN TARGET
---- OVERALL CONGESTION LEVEL

— CALL-IN TARGET
········ CLASS 1
---- CLASS 2
—··—··— CLASS 3

CONTROLLING TRAFFIC CONGESTION IN INTELLIGENT ELECTRONIC NETWORKS

BACKGROUND OF THE INVENTION

1. Field of the Invention

The present invention relates to traffic overload control in intelligent electronic networks, such as telephone networks.

2. Description of the Related Art

Additional features and functionality provided by telephone networks, for example, are growing at a rapid and largely unpredictable rate. Future new services will provide traffic demands on the network which are difficult to predict and will have demand profiles unlike those of the traditional telephone service. In other words in advanced intelligent networks, multiple services will be contending for the resources of various common network elements. In particular, service control points (SCPs) will form a natural point of concentration of the intelligence embedded in such networks. Numerous papers (see, for example, Franks and Wirth "UPT traffic issues—an agenda for the 90's" and Lipper and Rumsewicz, "Traffic issues in Personal Communications Service"—both papers published in the proceedings of the 8th ITC Specialist Seminar on Universal Personal Telecommunications, Santa Margherita Ligure, Italy, October, 1992), have argued that traffic on the telephone and signalling network will come much more unpredictable and volatile, with the consequence that overload control becomes a necessity, rather than a luxury, in the networks of the present and future. With numerous services being supported by common platforms, it is critical to build controls or "firewalls" that protect each service from the potentially detrimental impact of sudden load increases in a subset of the supported services. A failure to build effective controls will leave customers (both commercial and residential) unsatisfied. Consequently effective overload control is essential in modern networks to ensure that the network is robust.

The general problems of overload control in intelligent networks are well known and an overview of such problems is found in the article "Overload control of SCP systems" by U. Korner published in "Proceedings of the 13th International Teletraffic Congress, Copenhagen 1991".

SUMMARY OF THE INVENTION

It is therefore desirable to overcome one or more of the existing problems and to provide a method of, and apparatus for, determining, in real-time, when congestion or overload occurs in an intelligent electronic network.

It is also desirable to control congestion or overload in a telephone network including a service control point (SCP) in a manner which maintains SCP throughput at targeted levels.

According to one aspect of the invention there is provided a method of controlling traffic through at least one node in an intelligent telecommunications network having one or more subsystems that provide subscriber services in response to requests from customers for the services, said method comprising the steps of:

continuously monitoring the moving average of the traffic profile passing through the node for the or each subsystem;

detecting when congestion occurs at the node;

determining from said moving average of the traffic profile whether the congestion is caused by a sudden change in the traffic profile for a particular subsystem; and invoking congestion controls to control congestion at the node for the particular subsystem in which a sudden change in the traffic profile is determined.

According to another aspect of the invention, there is provided apparatus for controlling traffic in an intelligent telecommunications network having one or more nodes at which subscriber services are provided, wherein the apparatus comprises a service control means connected to the node or nodes and which is arranged to monitor the moving average of the traffic profile of requests for each subscriber service passing through the or each node, and arranged to produce a congestion control signal for a node -when a sudden change in the traffic profile of requests for a particular subscriber service causes congestion at the node.

The service control means preferably includes a central processing unit (CPU) at a service control point (SCP), the CPU being programmed to respond to query messages from nodes or service switching points (SSPs) when requests for subscriber services are received at the switching service points. The CPU may be conveniently programmed to send congestion control signals to the service switching points when it responds to the query messages.

In the method and apparatus of the invention, the moving average of the traffic profile for a particular subsystem or subsystems is preferably monitored by counting means for counting the number of requests for each subscriber service received at the service switching points within predetermined sequential time periods. The CPU of the service control point (SCP) may include means for comparing the number of requests for a particular subscriber service with the total number of requests in each predetermined time period.

The CPU may also include means for calculating an average of the amount of requests for particular subscriber services received over a plurality of preceding predetermined time periods and comparison means for comparing the amount of requests for a particular subscriber service in the most recent or current predetermined time period with said average of the amount of requests for that particular subscriber service in order to determine whether or not a sudden change in the traffic profile for that subscriber service has occurred.

The CPU of the service control point (SCP) preferably includes a database or list of all the subscriber services or dialled numbers available at the service switching points to which the service control point is connected. The CPU is preferably programmed to compile a focus list of dialled numbers of subscriber services which it has determined as a potential focus of congestion which may require congestion control. For instance, when the number of requests for a particular dialled number exceeds a threshold percentage or fraction of the total number of requests processed by the CPU in one of the predetermined time periods (the current monitoring interval), that dialled number may be placed on the focus list of dialled numbers which may require congestion control. Preferably, the CPU is programmed to target a particular dialled number on the focus list for congestion control if the amount of requests for that dialled number in the current monitoring interval is higher than the average amount of requests for that number over a plurality of preceding monitoring intervals.

Preferably, means are provided for determining the processor utilisation of the CPU to determine when congestion exists. This may be used to determine whether a general overload of traffic exists in addition to a focussed overload for a dialled number representing a particular subscriber service, which may be caused by a mass call in for the particular subscriber service.

Any convenient type of congestion control may be utilised in the method and apparatus of the present invention. In one particular embodiment, the SCP/CPU is arranged to send a congestion control signal to a switching service point (SSP) where congestion is detected for a particular subscriber service, and the admission control means is responsive to the congestion control signal to apply congestion control by throttling or limiting the percentage or fraction of queries which are passed by that SSP to the SCP.

BRIEF DESCRIPTION OF THE DRAWINGS

In order that the invention may be more readily understood, a specific embodiment thereof will now be described, by way of example only, with reference to the accompanying drawings in which:

FIG. 2 is a schematic block diagram of the functional parts of the SCP;

FIG. 3 is a flowchart of the manner of operation of the network of FIG. 1;

FIG. 4, comprising

DETAILED DESCRIPTION OF THE PREFERRED EXEMPLARY EMBODIMENTS OF THE INVENTION

Figure 1:
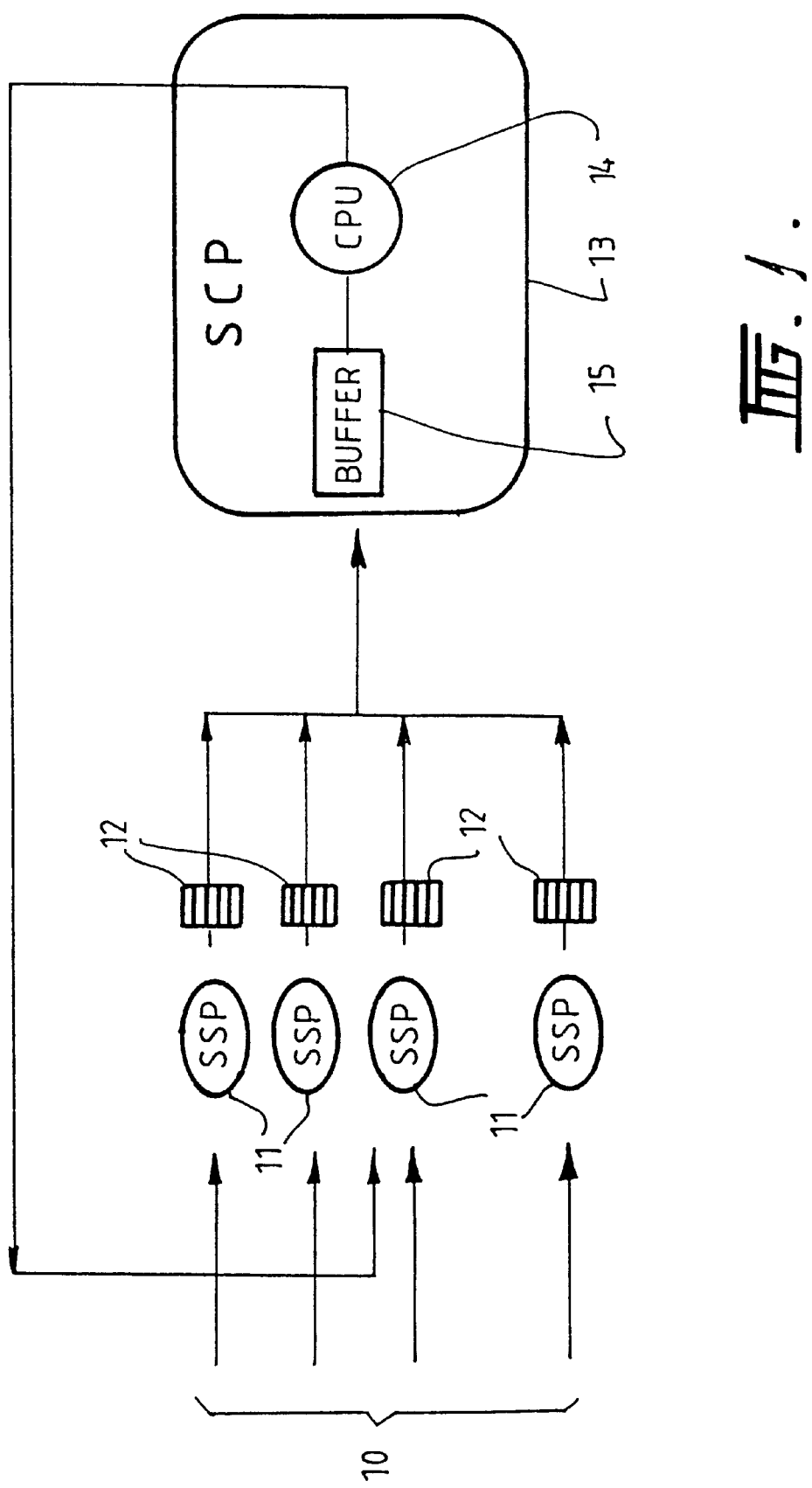
FIG. 1 is a schematic diagram of part of a telephone network including a service control point (SCP) for controlling traffic through a number of service switching points (SSPs) in accordance with the invention.

Referring to FIG. 1, part of a telephone network is shown which includes a number of telephone lines 10, a number of nodes or service switching points (SSPs) 11, each of which is connected to one or more telephone lines 10, and a single service control point (SCP) 13 connected to the SSPs 11. The SCP 13 includes a central processing unit (CPU) 14 for processing service requests from the SSPs 11, and storage means in the form of a SCP/CPU processing buffer 15. The SSPs include admission control means 12 which can apply admission control to determine which service requests are actually offered to the SCP.

Referring more particularly to the flowchart in FIG. 3, when a new call for a subscriber service having a particular dialled number j arrives at an SSP 11, (step 100) the admission control means 12 of the SSP determines whether the call is accepted or rejected (step 102). If the call is rejected, the caller is asked to retry (step 104). If the call is accepted, the SSP 11 sends a query message to the SCP 13 (step 106).

The admission control is based upon congestion status information received by the SSP 11 from the SCP 13 and can operate on either a dialled number basis or number-independent basis, that is, the control can be applied to specific target numbers or all calls to the service (independent of the specific target item). The type of control taken depends upon congestion information passed to the SSP 11 by the SCP 13.

The congestion information received from the SCP 13 indicates the percentage or fraction f of dialled number j service attempts that should be throttled (sent to re-order announcements) by the admission control means 12 of the SSP 11. The control is applied only to query messages, not conversation messages, and is enacted for a duration of $d_j$ seconds (also contained in the congestion information). If subsequently received status information is the same as the SSP perception of congestion in the SCP 12, the data is ignored, otherwise the SSP perception is updated and the duration of admission control is re-started. When the congestion duration $d_j$ expires, the SSP 11 ceases to throttle service attempts.

Subscribers that are sent to announcements, that is their calls have been throttled by the admission control scheme, or whose calls are rejected by the SCP 13 may reattempt.

When query messages arrive at the SCP 13 from the SSPs 11, they are placed in the SCP/CPU processing buffer 15 if it is not full (step 108), or else are discarded (step 110). When a query message is rejected because the SCP/CPU buffer 15 is full, the subscriber is sent to announcements, and is asked to reattempt the call. The query messages in the SCP/CPU buffer 15 are moved sequentially to the CPU 14 for processing (step 112).

After processing the query, the CPU of the SCP 15 performs an appropriate database search and generates a response message (step 114) which is returned to the appropriate SSP (step 116) which results in updating of the SSP admission control (step 118). This concludes the SCP involvement in the call.

The CPU 14 of the SCP is preferably programmed to monitor the following parameters: processor utilisation, number of queries arriving for each item, queries in the delay buffer, average response time, and the waiting time of each query or conversation message before is moves to the head of the CPU processing queue. Should the waiting time of a message exceed a given time T, the SCP automatically times out the requests and aborts processing on the call. No indication is sent to the originating SSP in this case.

Every $\tau_{interval}$ seconds, the internal SCP congestion status is updated according to changes in the monitored parameters, indicating, in some sense, the extent of the overload. The fraction of calls that should be throttled as a result of the current congestion status is piggy-backed on conversation and response messages returned to the originating SSP. It is important to note here that the congestion status of the SCP is maintained on a per number basis, that is, the SCP can send different congestion status information for each number in its database.

Figure 4A:
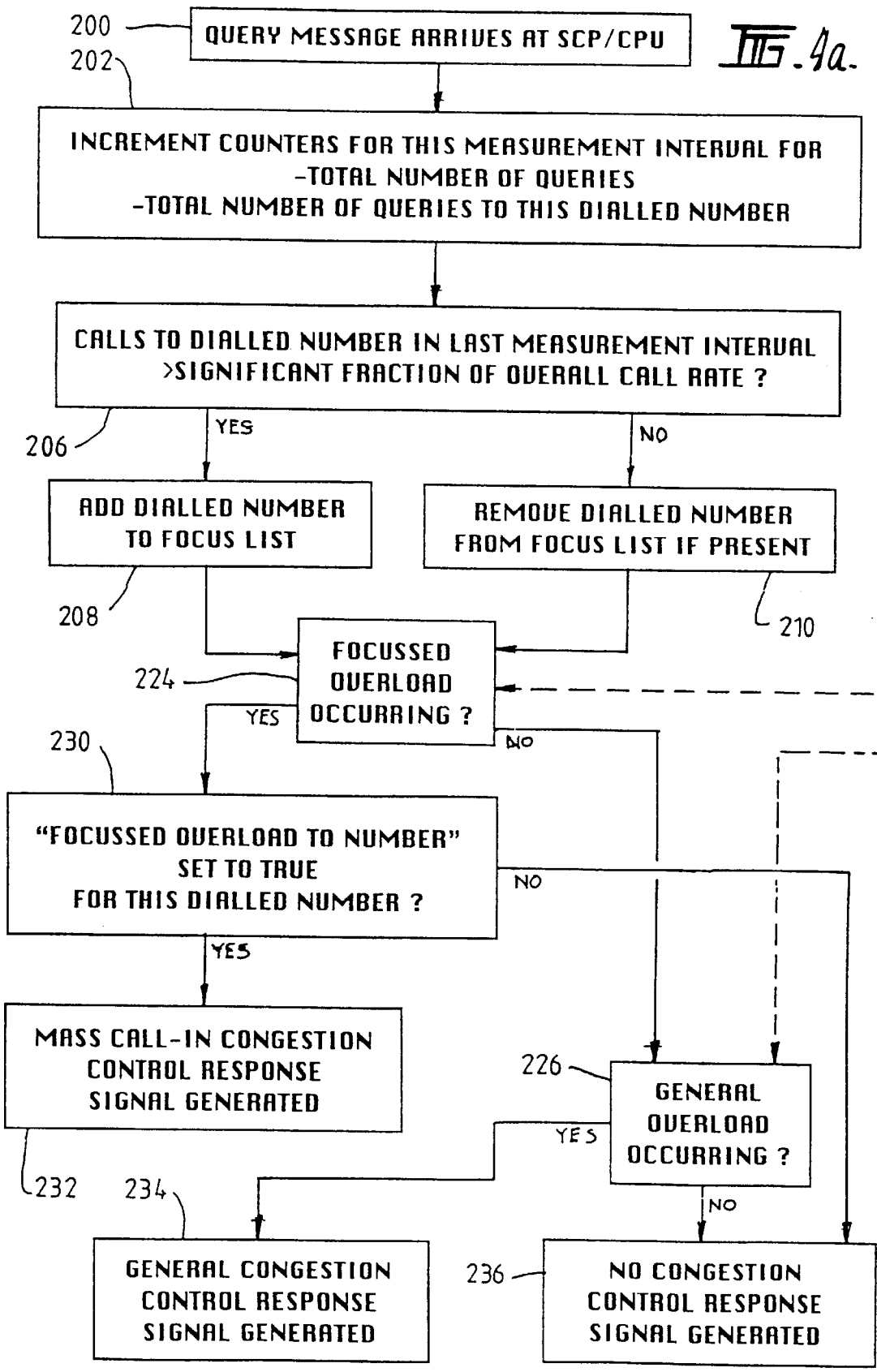
FIGS. 4a and 4b, is a more detailed flowchart showing the operation of a central processing unit of the SCP.
Figure 4B:
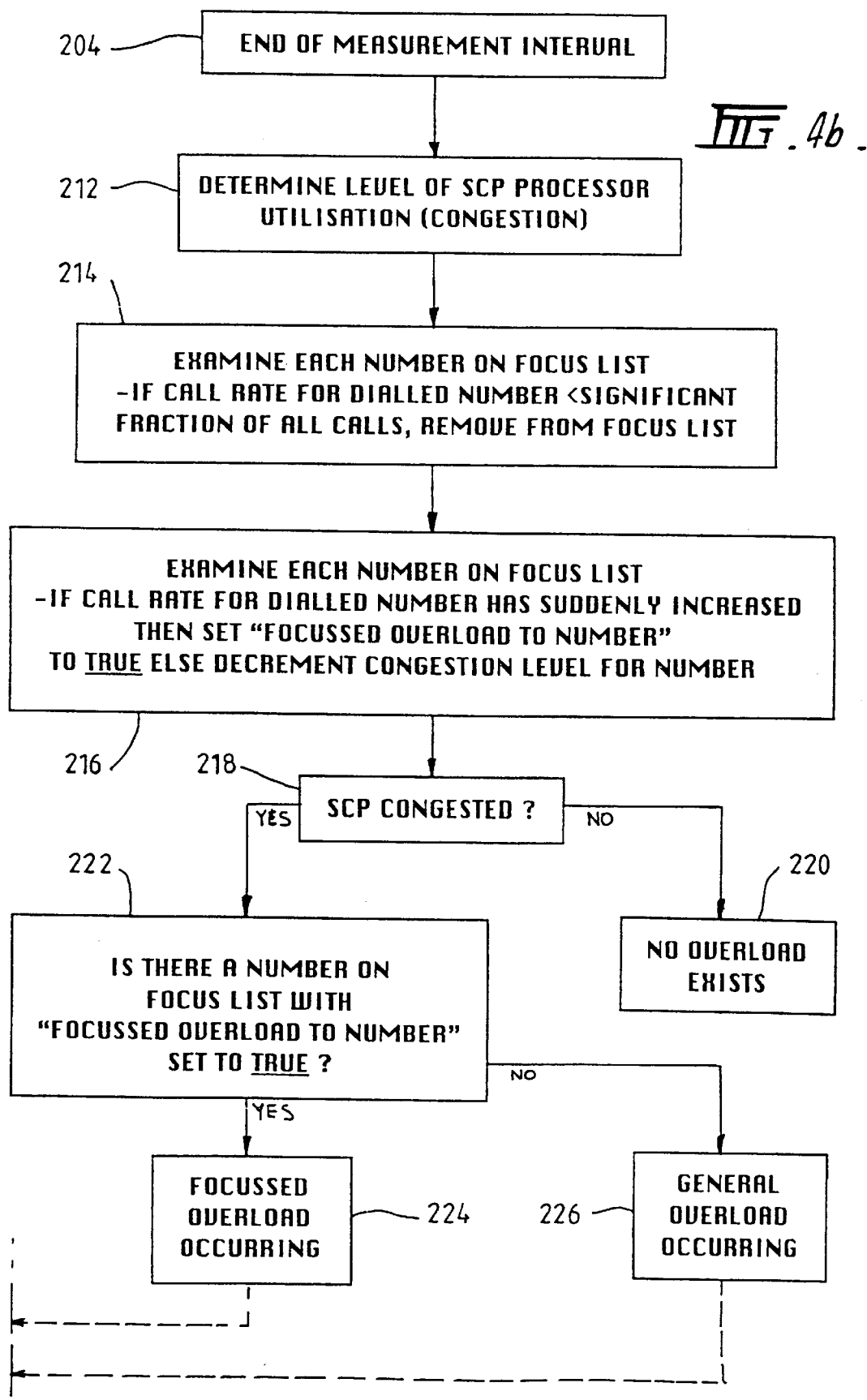

The congestion level of number j, denoted Cj, is assigned an integer value ranging from O to $C_{max}$, indicating extreme congestion. An overall SCP congestion level, C is also maintained which can be used if no focus for the congestion is found. This allows control of the service by informing traffic sources to control attempts independent of the number dialled by the subscriber. In each measurement period in which thresholds for any of the measured parameters are exceeded, the internal SCP congestion status is increased. Conversely, the SCP congestion status is decreased whenever all of the measured parameters are below certain thresholds. The mechanics of the load regulation method will now be described below with particular reference to FIGS. 2 and 4.

The load regulation method consists of two separate processes that work together in order to achieve the desired throughput characteristics during SCP overload. The first process provides an overload detection mechanism, that is, provides triggers for the onset and abatement of congestion. The second process provides the means by which numbers are targeted for control and the action that should be taken by SSPs to assist in controlling the problem. The processes are described below in a form of pseudo-code. The essence of the processes, however is quite straightforward. Referring to FIG. 2, the CPU of 14 of the SCP includes a clock or timing means 22 for timing measurement intervals, and counting means 24 for counting the amount of requests for particular dialled numbers of subscriber services and for counting the total number of requests for all dialled numbers within the measurement intervals. The SCP/CPU also includes a database 25 of all dialled numbers of the subscriber services, and a comparator 26 for comparing counts of the amount of requests Nj for a particular dialled number j received in the previous measurement interval with the total amount of requests N tot over all dialled numbers. If this exceeds a certain fraction, S, that dialled number is placed on a focus list 28 as a potential candidate for specific control. The CPU 14 of the SCP also includes storage or memory means 30 for storing the amount of requests for each particular dialled number and the total of requests for all dialled numbers over a number of successive preceding measurement intervals, moving average calculation means 32 for calculating the moving average of the traffic profile for each particular dialled number over those intervals, and a comparator 34 for comparing the amount of requests for particular dialled numbers in the most recent measurement interval with the moving average for the respective dialled numbers. If, a dialled number on the focus list 28 has experienced a relatively large, sudden, jump in offered call rate, then it is targeted for specific control. It simply remains a matter to decide on what constitutes overload and what process is used to throttle calls at the source.

In the preferred embodiment, the SCP includes a processor utilisation monitor 36 for determining when there is an overload of requests at the SCP and overload signal generating means 38 for generating focused overload and general overload signals.

In the detailed description of the detection and control processes which will now follow, the following definitions and terms will be used.

Definitions
   A significant increase in traffic is said to occur if the arrivals counted in a period is (100*Z)% higher than the average over the last M intervals.
   A dialled number is said to be the focus of traffic if a fraction, S, or more of the total incoming queries are destined for that dialled number.
   C is the congestion level
   I is the number by which the congestion level C is incremented if congestion is detected.
   D is the number by which the congestion level C is decremented when congestion abates.
Detection Process
   Inputs:
   Upper and lower bounds on the desired processor utilisation during congestion (denoted $U_u$ and $U_l$ respectively).
   F, the maximum number of dialled numbers which can be kept on the focus list (which is used to determine the targets of mass call-ins)
   M, the number of measurement intervals over which average arrival rates are computed.

Variables required:
   For each dialled number in the database a record must be kept of the last measurement interval in which a query arrived, denoted $T_j$, where j can be used to identify any dialled number in the database.
   A record of the last measurement interval in which a query arrived, denoted T.
   A list, denoted focus list, capable of storing up to F dialled numbers.
   For each dialled number in the database a boolean variable, denoted $F_j$, to denote whether dialled number j is on the focus list.
Counters required:
   For each dialled number in the database a record must be kept of the number of arriving queries in each of the last M measurement intervals, denoted $N_{ij}$, where i=0, ..., M−1, and j identifies any item in the database.
   A counter for counting the total number of queries arriving in the last measurement interval, $N_{last}$.
   A counter for counting the total number of queries that have arrived in the
   present measurement interval, $N_{present}$.
Processing Actions:
   Let k be the identifier of the present measurement interval.
   Let i≈k (module M).
   On arrival of a query message at the SCP/CPU (step 200) for dialled number j the total number of queries that have arrived in the present measurement interval, $N_{present}$ is incremented, i.e. $N_{present}$++ (step 202).
   If the last request for dialled number j was in a previous interval, i.e. If $T_j$<k, then the number of queries for the dialled number j in the present interval is one, i.e. $N_{ij}$≈1. If the last request for dialled number j was in the present interval, $T_j$≈k, then the number of queries for the dialled number $N_{ij}$ in the present interval is incremented (step 202) (i.e. $N_{ij}$++).
   At the end of each measurement interval (step 204), the amount of calls to dialled number j is compared with the total amount of calls for all dialled numbers Ntot (step 206), and if the amount of calls to dialled number j in the previous interval was a significant fraction of the overall call rate, j is placed on the focus list (step 208) by assigning j the Boolean variable, $F_j$≈TRUE.
   i.e. If $$N_{i-1j} > S*N_{last}, F_j = \text{TRUE}$$

otherwise if j is on the focus list and its specific congestion level $C_j$ is 0 and its rescaled arrival rate $N_{i-1}/N_{last}(1-f_j)$ is less than a significant fraction S of all arriving queries, j is removed from the focus list (step 210), i.e.
If $$(F_j = \text{TRUE})\ \&\&\ (N_{i-1j}/(1-f_j) < S*N_{last})\ \&\&\ (C_j=0)$$

Remove j from focus list, by setting
$C_j$≈0
$F_j$≈FALSE
   At the end of each measurement interval (step 204), the processor utilisation, U, is determined (step 212), and the identifier of current measurement interval, k, is incremented, (i.e. k++). Also, the total number of queries that arrived in the present measurement interval which has just ended, $N_{present}$, becomes the total number of queries in the last measurement interval, $N_{last}$, (i.e. $N_{last}$≈$N_{present}$); and $N_{present}$ is reset to zero ($N_{present}$≈0). When there is no focussed overload, a boolean variable representing "focussed overload"≈FALSE.

The CPU also checks to see if any items on the focus list should be removed, in the following manner. For each dialled number, j, in the focus list, if the last measurement interval in which a query for number j arrived, $T_j$, is equal to the last but one measurement interval, i-1, i.e. ($T_j!\approx i-1$), the counter $N_{1-lj}$ is set to zero i.e. ($N_{i-lj}\approx 0$) (step 214). This takes care of situation in which an item on the focus list suddenly stops receiving calls and thus does not clear the counter $N_{i-lj}$. This would have allowed the item to stay on the list even though no calls were received. Also if the rescaled arrival rate of dialled number f is less than the significant fraction S of all arriving queries, i.e. if $N_{i-lj}/(1-f_j)<S*N_{last}$, where $f_j\approx C_j/C_{max}$, the congestion status for dialled number j divided by the maximum congestion status $C_{max}$, then j is removed from the focus list by setting $C_j$ to zero and boolean variable $F_j$ to false.

$C_j\approx 0$ $F_j\approx$FALSE

If the processor utilisation, U is less than the upper bound, $U_u$ for processor utilisation, no overload exists (step 220). If the processor utilisation is greater than the upper bound $U_u$, (i.e. If $U>U_u$), then, for each item, j, in focus list, the network wide offered call rate to item j, including attempts throttled at SSPs, is estimated, i.e.

$N\hat{}\approx N_{i-lj}/(1-f_j)$ where $N\hat{}_j\approx$average item j arrival rate over M intervals. The processor then checks whether the network offered call rate to item j has increased significantly (step 216) and if so, i.e. If $N>(1+Z)*\hat{N}_j$, then there is a focussed overload, i.e. "focussed overload"≈TRUE (step 222). When there is a focussed overload (step 224) to item j, the congestion level C for number j is incremented, i.e. $C_j\approx \min(C_{max}, C_j+I)$. Otherwise, the congestion level C for dialled number j is decremented.

$C_j\approx \max(0, C_j-D)$.

If no focus exists and congestion exists (step 218) as determined by the processor utilisation U increasing above the upper bound $U_u$, there is a general overload occurring (step 226) and the SCP congestion status is incremented, i.e. if focussed overload=FALSE & $U>U_u$ then $C\approx \min(C_{max}, C+I)$. If congestion has abated as determined by the processor utilisation falling below the lower bound $U_l$, all congestion statuses are decremented, i.e. if $U<U_l$, $C\approx \max(0,C-D)$, and for each item, j, in focus list $C_j\approx \max(0, C_j-D)$ End of Detection Process Control Process At start of each measurement interval, throttling and duration parameters f and d respectively, are set for each dialled number, j, on the focus list, where:

f≈$C/C_{max}$, the fraction or percentage of service attempts that should be throttled (real division rather than an integer)

d≈d(C), the duration for which congestion control is applied (as defined in a table of duration values)

Thus, $f_j\approx C_j/C_{max}$; and $d_j\approx d(C_j)$

On arrival of a query for dialled number j, if there is a focussed overload for dialled number j, i.e. if "focussed overload"=TRUE and $F_j$=TRUE (step 230), a mass call-in congestion indicator signal is sent to the SSP source (step 232) with parameters $f_j$ and $d_j$ concerning j only (i.e. mass call-in indication is given to the source). The SSP can then use admission controls to throttle calls to the dialled number j. If overall congestion exists without a particular focus, (step 234) i.e. if "focussed overload"=FALSE and C>0; a general congestion indicator signal is sent to the SSP source with parameters f and d requesting that all attempts to the service be subjected to admission controls, (i.e. general overload indication is given to the source). If there is no general or focussed overload, no congestion control signal is generated (step 236).

Action taken by traffic sources:

The SSP sources apply admission control (percent throttling) to a new call attempt according to whether:

The call attempt is to a dialled number about which mass call-in control is active General overload SCP indication has been received.

End of Control Process

In the method described above, the capability of retaining measurements over a set of measurements intervals does not require that the counters for each item in the database actually be written or cleared at the beginning of each measurement period, which would otherwise be a tremendous drain on processing capacity.

The addition to an item to the focus list is based on the number of calls to that item in the previous interval. Whenever a call arrives a check is made as to when the last query for that item occurred and the counter is updated or reset appropriately. This automatically ensures that only currently "active" items can be on the focus list.

Problems might have occurred in the extreme situation in which an item on the focus list suddenly stops receiving calls altogether (in which case the counter would not have been cleared). However, this is taken care of through the checking of when the last arrival occurred.

For items with relatively low arrival rates, in which case it is likely that there will be a number of periods in which no calls arrive, the counters may not get reset. However, these counters are only used when an item is placed on the focus list and thus the "incorrectness" of the information is irrelevant.

Computation of the average arrival rate only occurs for items on the focus list, so processing cost is independent of the size of the database.

The double check of relative call rate (through the parameter S) and the instantaneous change of arrival rate (through the parameter Z) allows for the possibility that the normal call mix at the SCP is dominated by calls to a single item. In such cases the targeting of the "large" volume item is unwarranted if there is no corresponding jump in its call rate.

The control process specified uses percent throttling as the control mechanism. Any feedback based control mechanism could, in principle, be used (such as Automatic Code Gapping) since the control and detection processes work independently. However, extra information may need to be communicated between the SSPs and SCP to ensure quality of service aspects such as fairness.

It has been claimed that the impact on systems processing capacity of implementing the above-described processes in the present invention is minimal and we now justify this assertion.

SCPs typically maintain statistics on the number of incoming queries (both total and to each item in the database). Thus, statistics collection by itself does not add any extra load. However, details down to the number of queries in each measurement interval are not usually expected.

The way the processes have been implemented requires extra processing capability and cost, of course, as does the need for variables describing the last measurement interval in which an arrival occurred and for tracking whether an item is on the focus list.

As to additional processing, with each query arrival, it is necessary to check to see when the last arrival for that item occurred, together with incrementing of the arrival counter.

One multiplication, one division, one addition and one comparison are required to determine whether the item should be added to the focus list. One comparison is required to determine whether the item should be taken off the focus list. Note that the use of the boolean variable $F_j$ allows a simpler lookup than searching the focus list itself for item j.

Thus, per call, the impact on processing capacity is likely to be negligible compared to the actual cost of accepting the query, decoding the various protocol headers and determining the nature of the service request. Note also that services requiring multiple transactions only see the added processing on the arrival of query messages, not conversation messages.

At the end of each measurement interval, the focus list must be searched. If the focus list is empty, no additional processing is incurred. During a focussed overload it is likely that there will only be a small number of items on the list and thus the processing cost incurred at this time is minimal.

As discussed in the detection algorithm description, the counters being used do not have to be cleared if no calls arrive. Thus, no processing overhead is incurred which requires all counters in the database to be accessed regularly.

It is therefore concluded that there is likely to be little capacity impact as a result of implementing these algorithms.

The potentially improved network performance of the method of congestion control of the present invention will now be described with reference to FIGS. 4 to 7 which show graphs of SCP Processor Utilisation and Service Completion Rates for the simulation parameters as set forth in Table 1 below.

TABLE 1

Simulation Parameters

| Description | Value |
| --- | --- |
| Processor utilisation lower and upper bounds, $U_l$ and $U_u$ | 0.8, 0.85 |
| Highest congestion level, $C_{max}$ | 20 |
| Control interval length for SCP measurements | 5 sec |
| Mean time between transactions (for multiple taansaction cases) | 10 sec |
| Processing time per transaction (aborted or processed) | 2.5 ms |
| Processing time per dropped transaction at delay buffer | 0 ms |
| CPU processing queue query acceptance threshold, J | 100 |
| SCP timeout parameter | 2 sec |
| Traffic fraction to be added to focus list, S | 10% |
| Focussed overload threshold, Z | 25% |
| Number of intervals for averaging arrival rate, M | 20 (= 100 sec) |
| SSP duration of overload controls for each service, d | 10 sec |

TABLE 1-continued

Simulation Parameters

| Description | Value |
| --- | --- |
| Customer reattempt probability (non call-in related calls only) | 0.7 |
| Customer mean reattempt time | 30 sec |
| Number of nodes in network | 50 |

In the examples below and FIGS. 5 to 8 we examine the call completion characteristics of the processes described and their ability to isolate the focus of a mass call-in without unduly impacting calls to other items in the database.

We have chosen to set, $C_{max}$ the highest congestion level, to 20, I to Z and D to 1. This means that when congestion is detected the congestion status is increased by 2 and subsequently an extra 10% of calls (recall that $f_i=C_i/C_{max}$) are throttled at the sources. Upon congestion abatement the congestion status is decreased by 1 and the thus an extra 5% of calls are allowed into the network. This gives a slightly finer-grained control than using equal increases and decreases.

In addition, we have decided that a significant increase in traffic is said to occur if the traffic rate for an item increases by more than 25% (the parameter Z defined earlier). Calls to a specific item are said to constitute a significant fraction of the total calls if they represent more than 10% of the total call volume (the parameter S defined earlier).

The main performance measures of interest are throughput (including impact on non-stimulated traffic) and processor utilisation.

In each of the examples below, we will look at a single offered load profile, a relatively severe overload, in which the first offered load (that is, not including reattempts) is 0.6 erlangs for time O<t<300 seconds 2.4 erlangs for time 300<t<900 seconds 0.6 erlangs for time t>900.

If there is a focus to the overload, the SPC sees a first offered load of 1.8 erlang directed to the focus, with the load offered to the other items unchanged. If it is general overload, with no focus, the call rate to each item is scaled up proportionately.

The reattempt probability for calls not destined for the focus of a call-in is 0.7. If a call is aimed at the focus, the reattempt probability is zero. We are essentially saying, in this case, that the total query rate to the focus is bounded. Physically, we can justify this as follows: In a call-in there is likely to be certain population of users desperately trying to get through. They "immediately" re-try if their call fails (either dropped or rejected by the SCP in this case). These users only give up at the designated "end" of the competition, for instance. Thus, the overall call rate (including re-attempts) to the focus can be approximated by the number of calling users multiplied by their reattempt rate. It is this overall call rate that we use during the congested period. No other reattempt probability is therefore required.

The desired operating range of the SCP is between 80% and 85% processor utilisation. In general we will show the results of a single simulation run. Averages over multiple runs tend to hide the dynamics of the system which are critical in understanding the behaviour of the process. We have also broken up the range of possible items in the database into 4 groups:

1. Items which have a relatively low request rate.

2. Items which have a medium request rate.

3. Items which have a relatively high request rate.

4. The call-in target (when a focus exists).

Breaking up the offered traffic in this way will allow us to see more easily whether all groups of items are treated essentially equally during overload situations.

EXAMPLE 1

Single Transaction Based Services, General Overload

We first examine single transaction based services, that is, those requiring only a single query and single response (no conversation) between SSPs and the SCP. The SCP capacity is 400 calls per second (2.5 ms per transaction, one transaction per call).

Figure 5A:
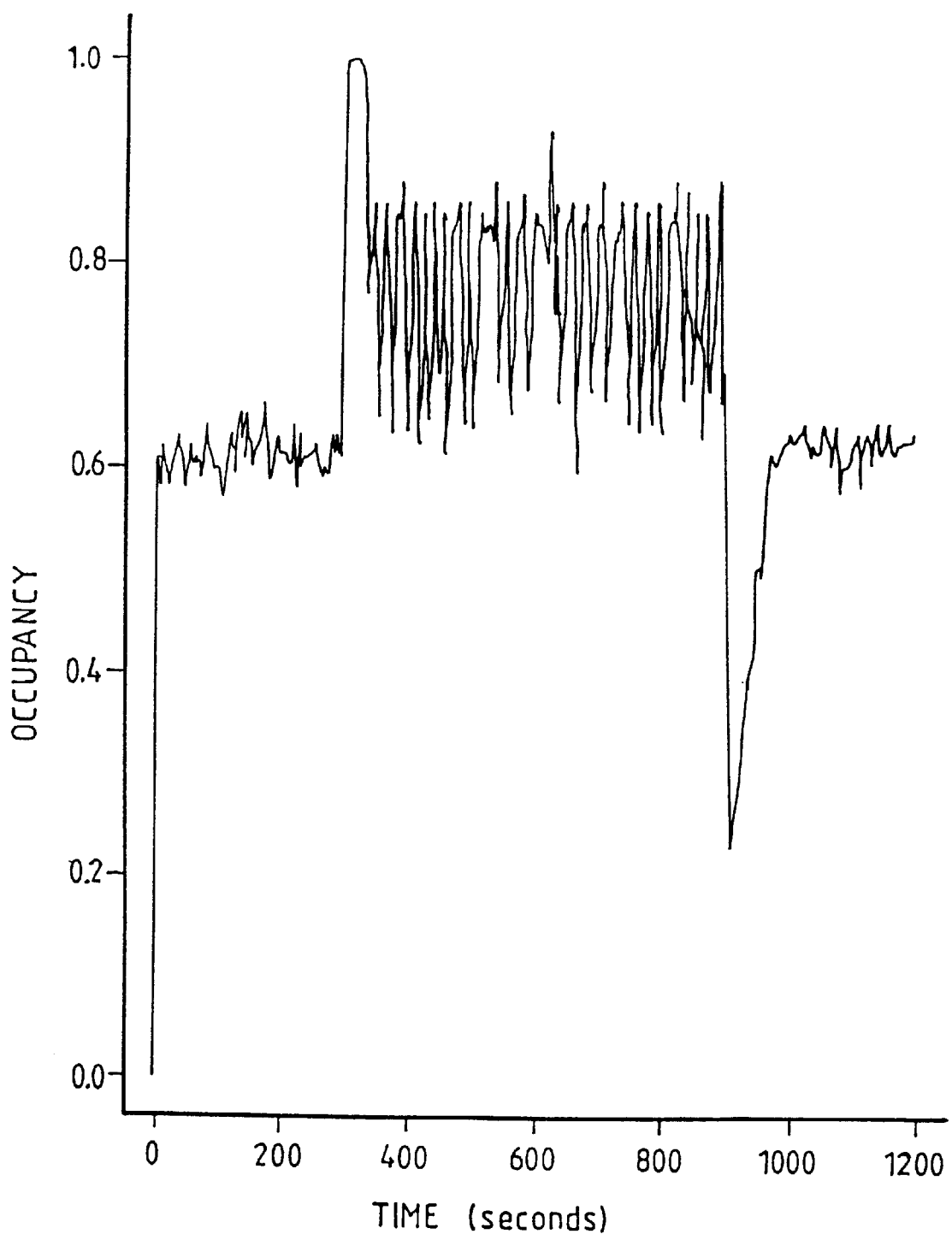
FIGS. 5a and 5b are graphs of simulated processor utilisation and call completion rates for one example of congestion control in accordance with the present invention.
Figure 5B:
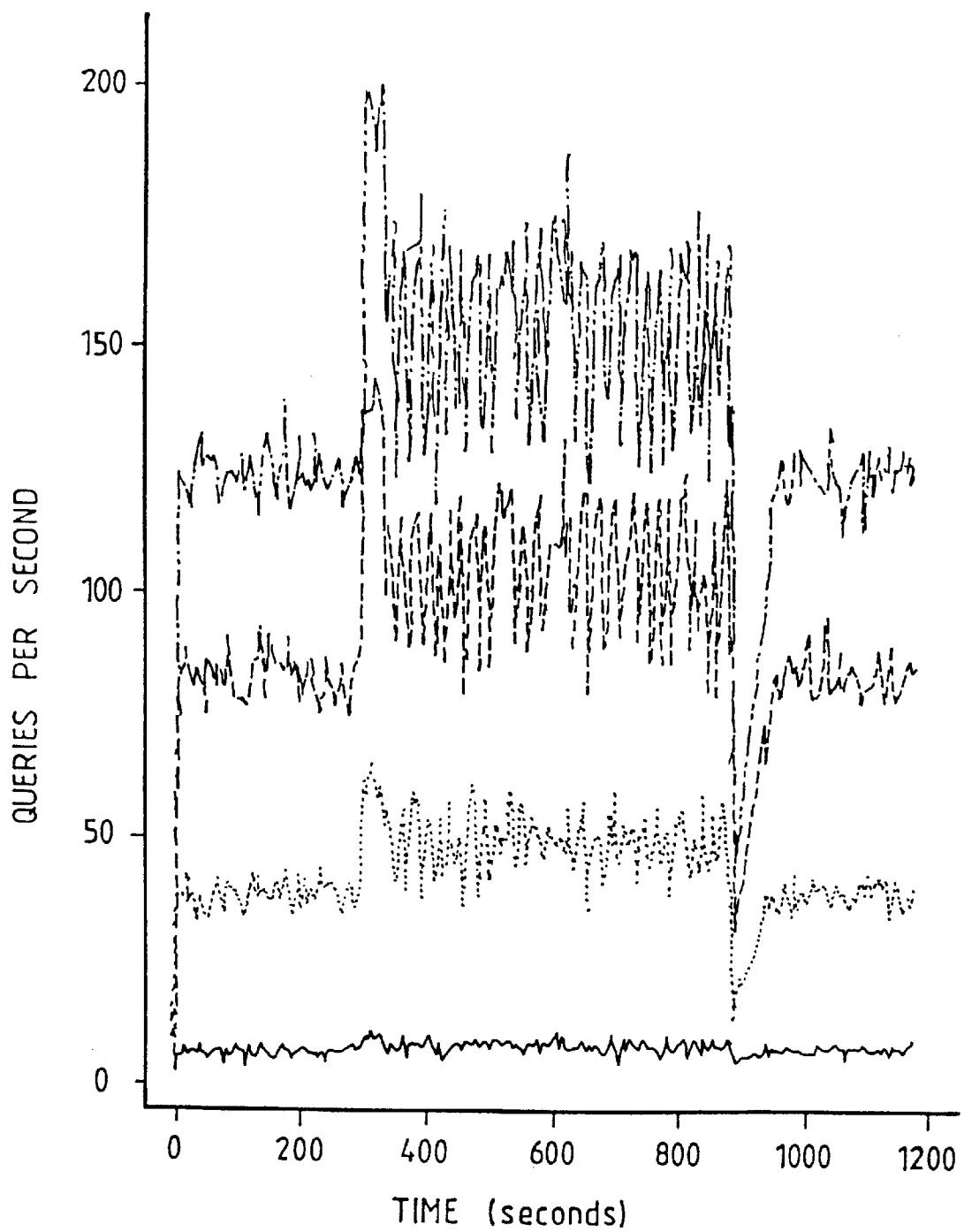

In FIGS. 5a and 5b we see the processor utilisation and call completion rates for a general overload (no focus). We observe that even in this relatively extreme overload scenario the processor load on the SCP is kept in the vicinity of the desired operating range. While some oscillation occurs as the systems attempts to maintain an operating point near its maximum level, we see that the performance is reasonably uniform for the entire duration of the congestion period. Recall that as no focus of the call-in exists in this case, all items are immediately subject to control at the SCP's request, based on the fact that they are trying to access the same service. It should be noted that control of each item individually (that is, requiring the SCP to individually target each item in the database) would be unsuccessful as too much control information would need to be sent to the traffic sources.

In terms of SCP throughput we see that approximately 300 calls per second are being completed during the overload period. This corresponds, approximately, to a throughput using 75% of the SCPs processing resources, compared to the target 80–85% desired operating range. We believe that this is a very good result given the severity of the overload scenario.

EXAMPLE 2

Dual Transaction Based Services, General Overload

Figure 6A:
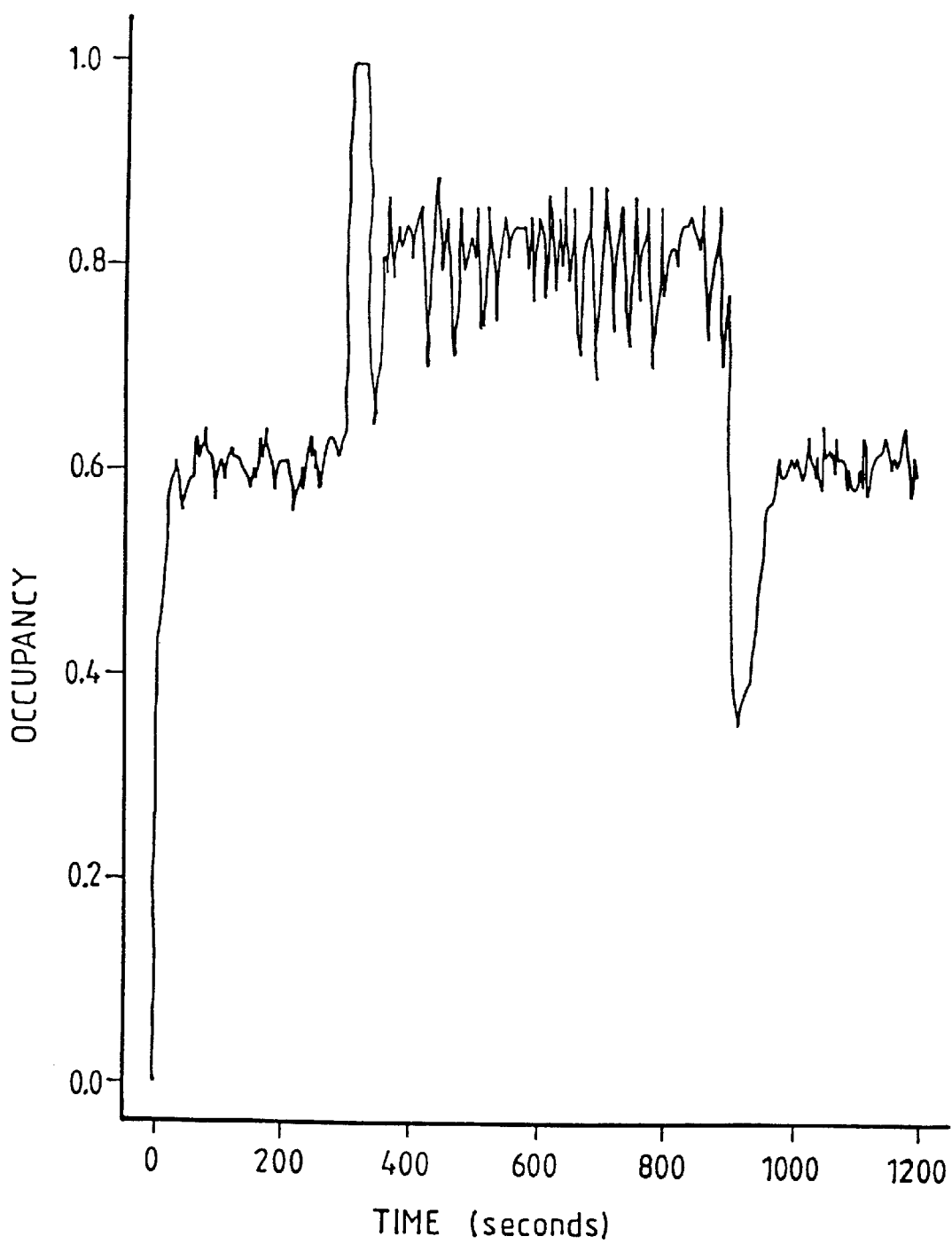
FIGS. 6a and 6b are graphs similar to FIGS. 5a and 5b for another example of congestion control.
Figure 6B:
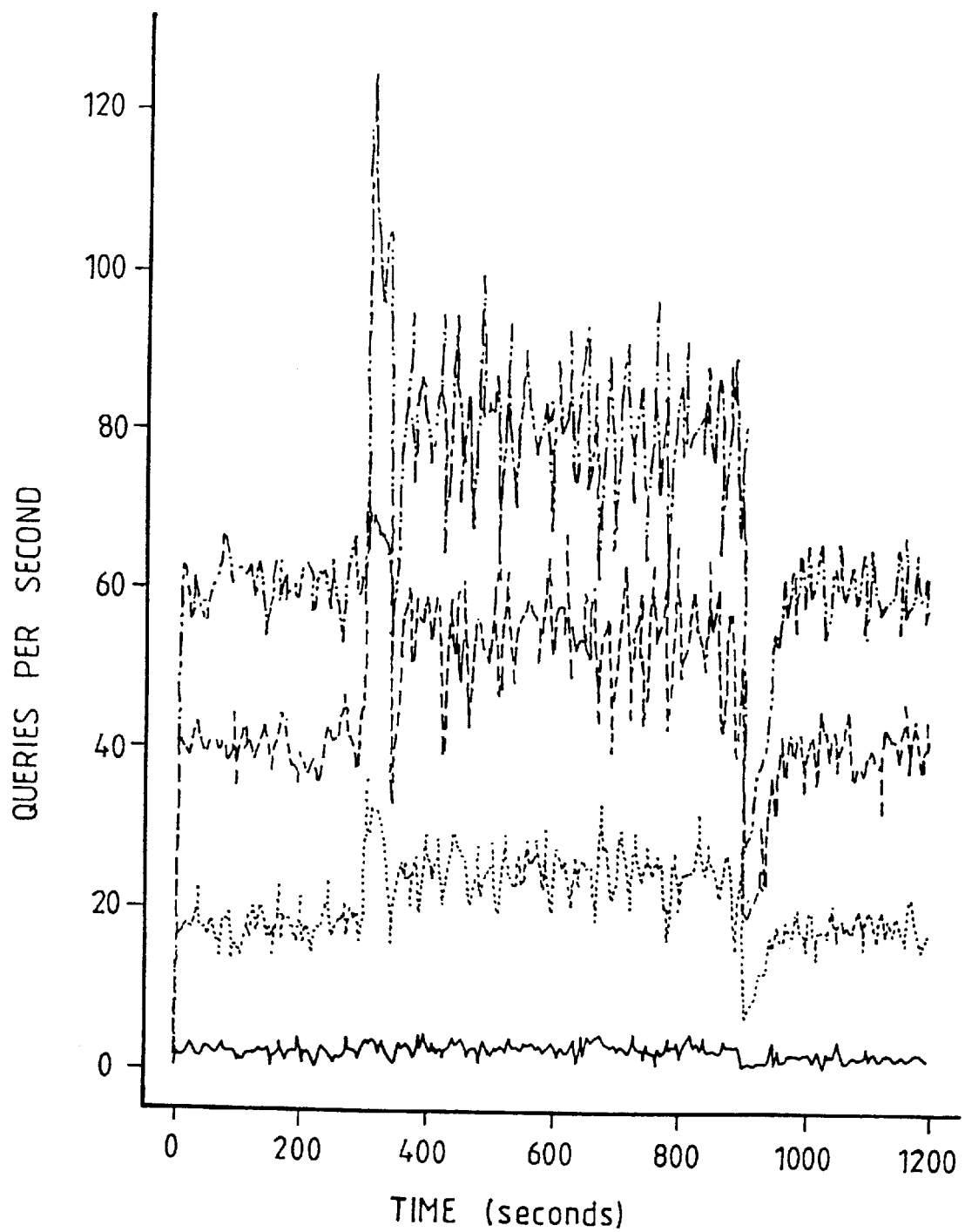

In FIGS. 6a and 6b we examine a similar case, except that the service offered by the SCP requires two transactions per call (2.5 ms processing time per transaction or 5 ms per call). The transactions average ten seconds apart here. We see that the overall performance is very similar to that discussed above (rescaled, however, because calls are twice as costly in terms of processing at the SCP). Other experiments that have been performed, not shown or described here, support the finding that the exact nature of the service, in terms of number of transactions per call, does not have a significant effect on the performance of the process during general overloads.

In this instance the overall throughput is approximately 160 calls per second during the congested period. This corresponds, approximately, to a throughput using 80% of the SCPs processing resources, compared to the target 80–85% desired operating range.

EXAMPLE 3

Single Transaction Based Services, Focussed Overload

Now we look at whether or not the process is effective in finding the target of a call-in and how effective the control strategy is in maintaining throughput without significantly impacting callers to other items. As above, we look firstly at single transaction services.

Figure 7A:
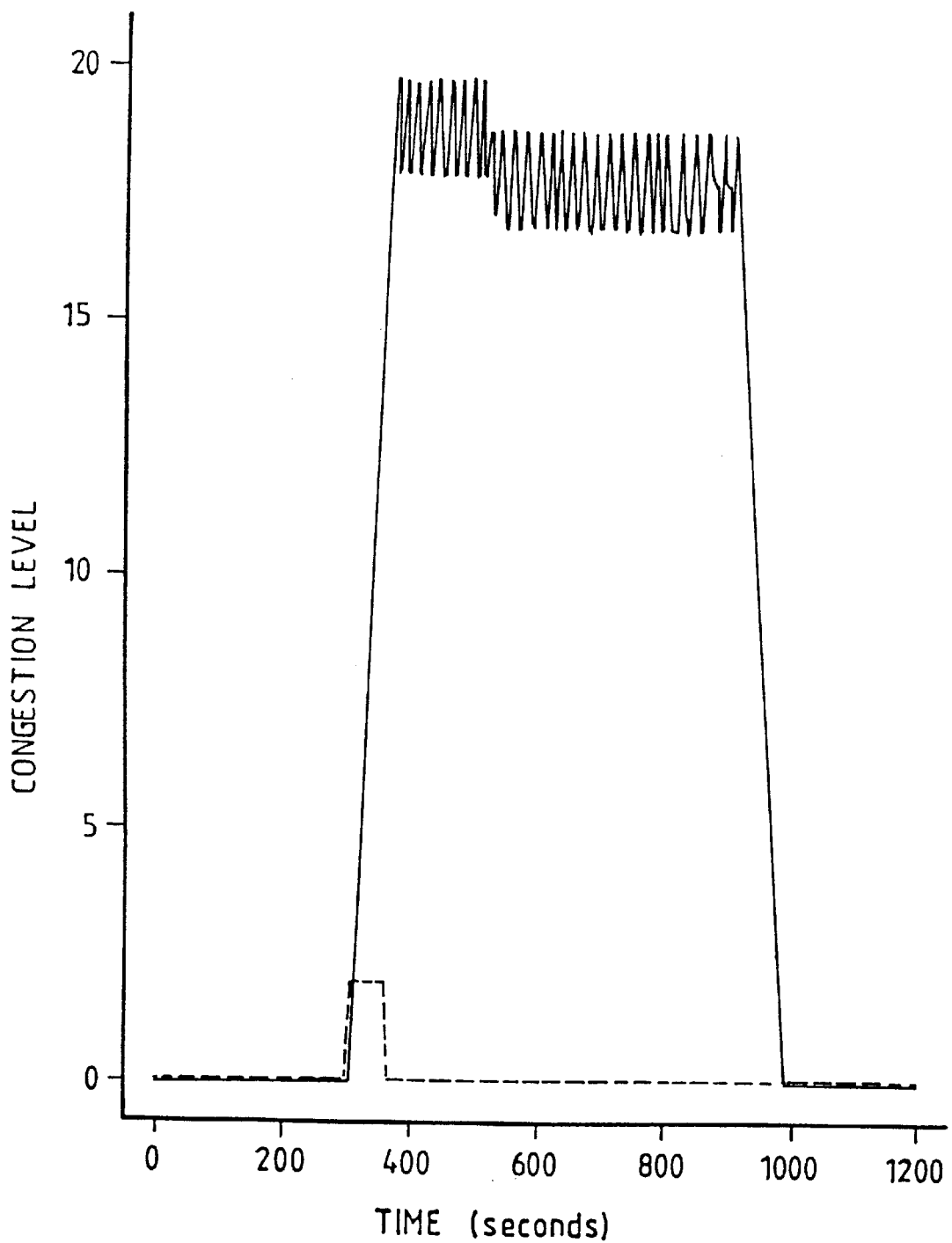
FIGS. 7a, 7b and 7c are graphs for a further example of congestion control.
Figure 7B:
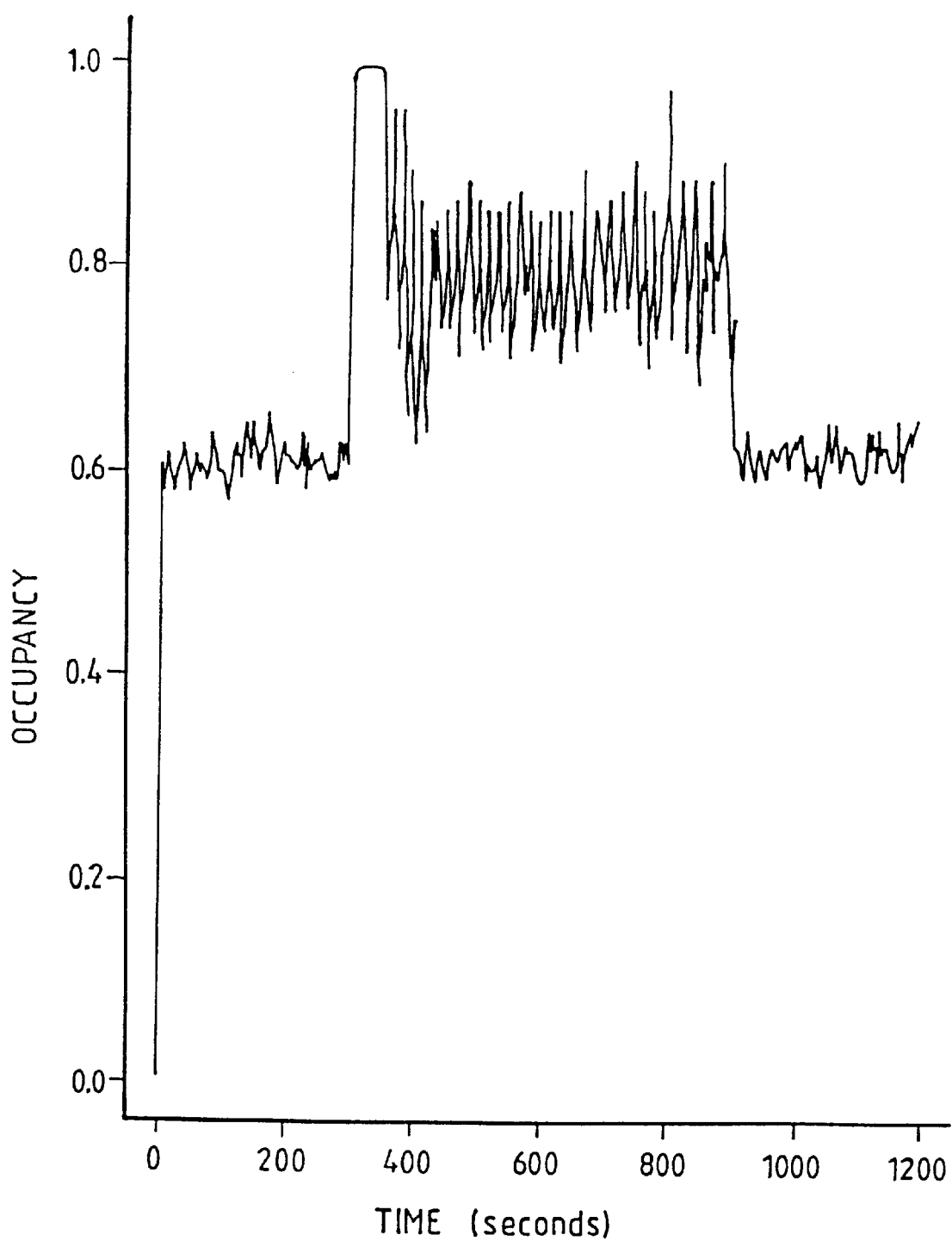
Figure 7C:
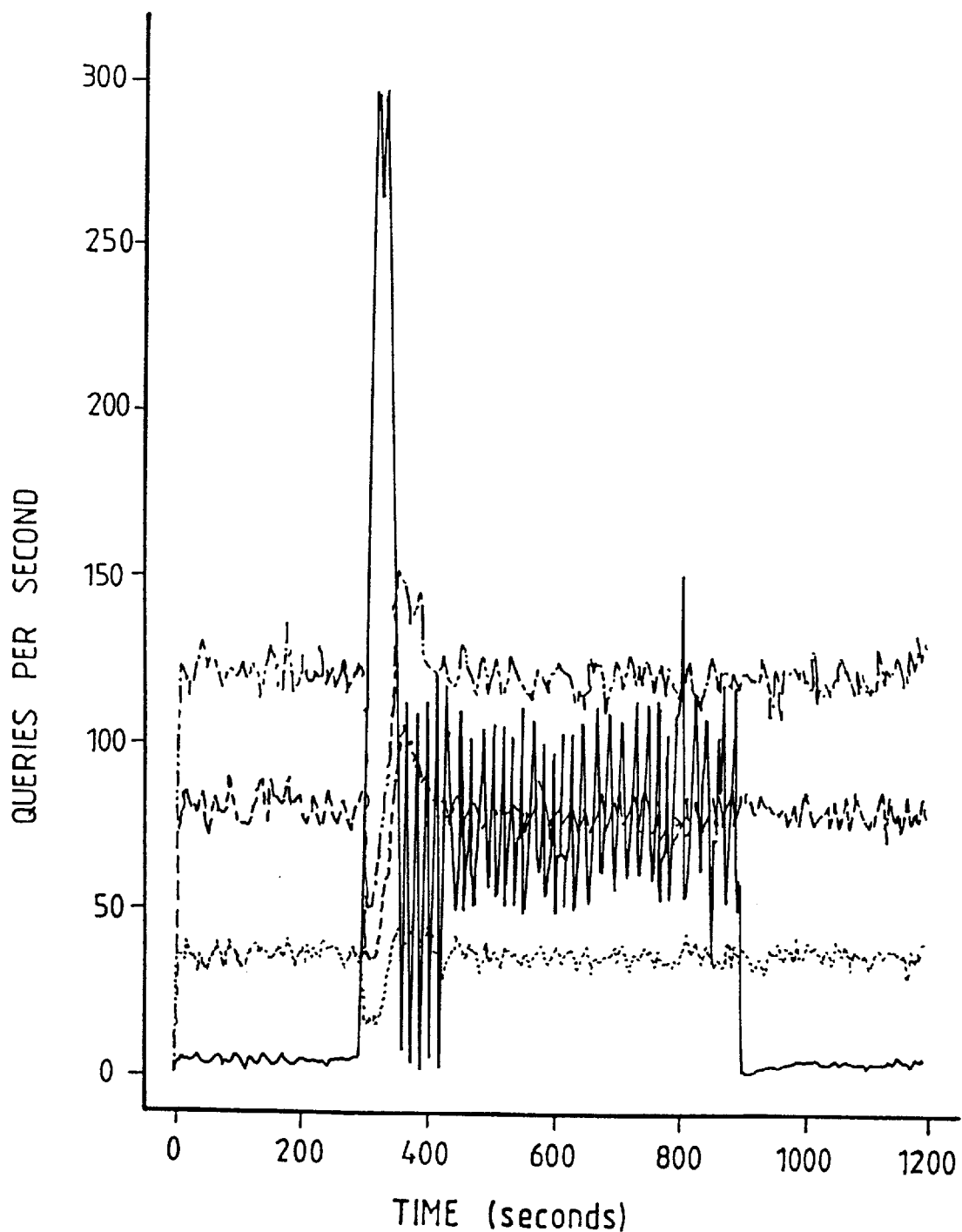

In FIGS. 7a, 7b and 7c we show the relevant congestion levels maintained by the SCP (namely, for the call-in target and for the SCP overall), the processor utilisation, and the throughput of the calls to the call-in target and classes 1, 2 and 3 representing relatively low, medium and high request rates.

Looking at the congestion level, we see that the overall SCP congestion level (which is sent to all traffic sources concerning all items in the SCP) is non-zero for the initial period of the congestion episode. This is because at the end of the period in which congestion is first congested, no items have been placed on the focus list (recall that items are placed on the focus list based on the number of accesses in the previous interval). Thus, congestion has been detected but no potential focus yet determined. The overall congestion level stays non-zero until the processor utilisation is eventually controlled and brought back down the desired operating point. Note that once the focus has been found, the overall congestion level does not increase any more. This protects the rest of the SCP users from undue performance degradation during this transient period.

The focus of the congestion is determined in the second measurement interval after the load has increased. Its congestion level is increased until the load is controlled. From that point on, the congestion level is stable (in the sense that it hovers around a specific operating point). We see that the processor utilisation remains very stable near the desired operating region (80% to 85% occupancy) and that the throughput of the three classes of traffic remains stable at their pre-congestion levels (after the initial transient period).

We note here that the initial transient throughput drop of non-focus calls can be lowered by allowing the overall congestion level to decrease once a focus has been found, rather than waiting until the congestion subsides.

In this case, the overall SCP throughput is approximately 320 calls per second during the congested period. This corresponds, approximately, to a throughput using 80% of the SCPs processing resources, compared to the target 80–85% desired operating range.

EXAMPLE 4

Dual Transaction Based Services, Focussed Overload

Figure 8A:
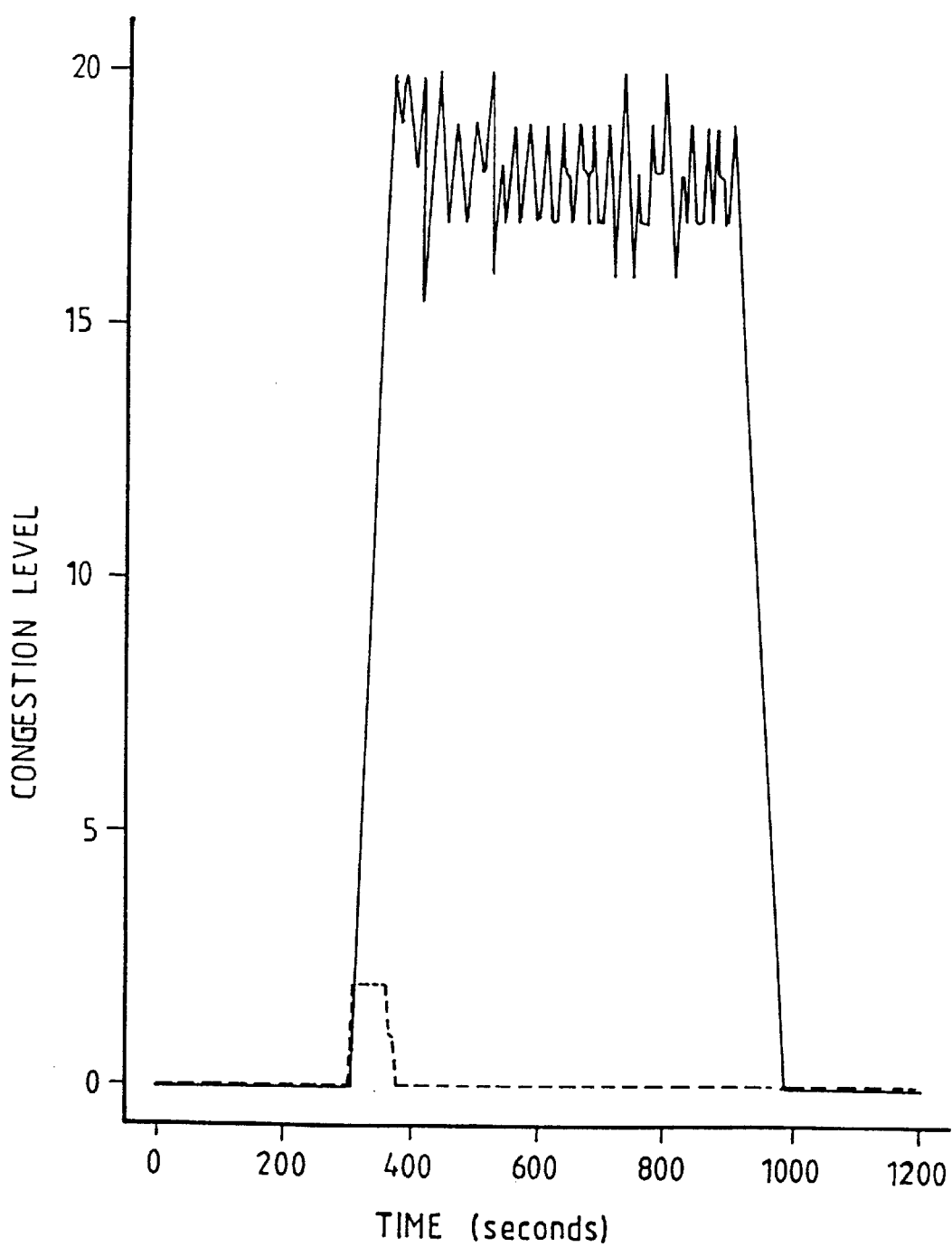
FIGS. 8a, 8b and 8c are graphs for another example of congestion control.
Figure 8B:
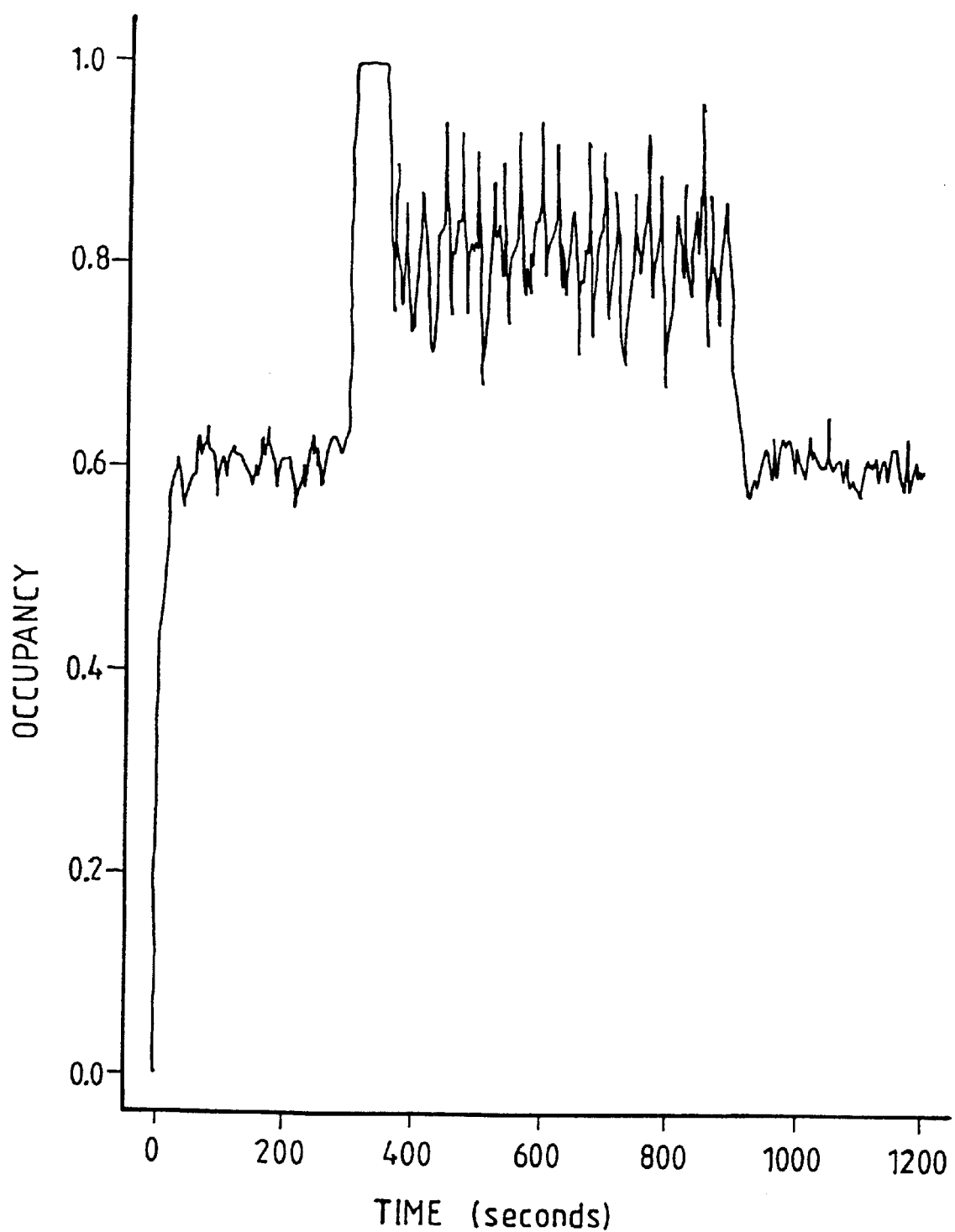
Figure 8C:
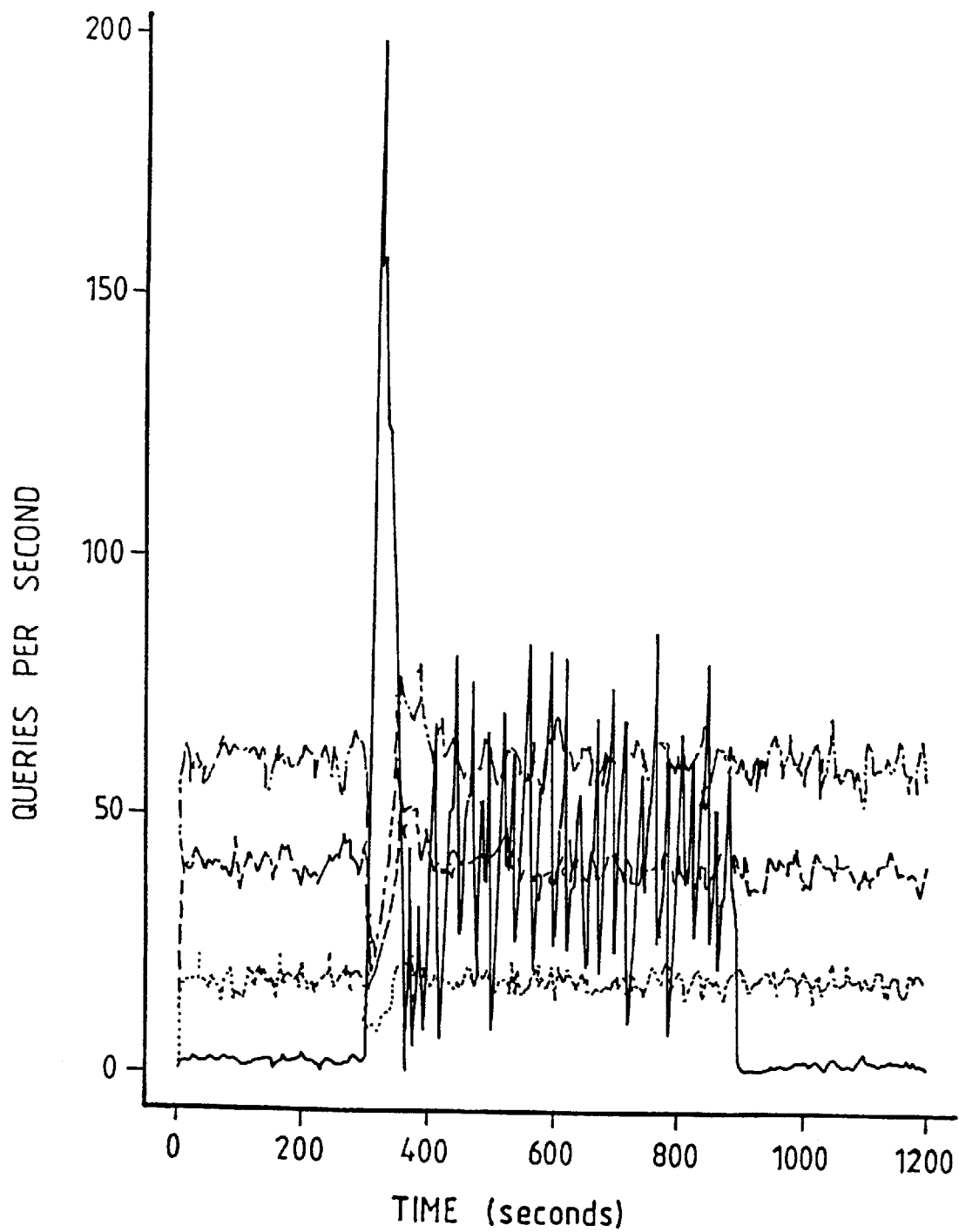

We now examine services consisting of two transactions. In FIGS. 8a, 8b and 8c we see exactly the same features described in the previous subsection on single transaction services.

In this case, the overall SCP throughput is approximately 160 calls per second during the congested period. This corresponds, approximately, to a throughput using 80% of the SCPs processing resources, compared to the target 80–85% desired operating range.

In this invention we have presented a method of and apparatus for the real-time detection and control of Service Control Point (SCP) congestion during a mass call-in. The method accurately pin-points the focus of a call-in (if it exists) and takes action to notify traffic sources of the controls to be taken. The detection process is cheap, in terms of processing capacity, to implement and relies primarily on counters already maintained by SCPs. The process has been demonstrated to be effective at offered loads of up to three times the SCP capacity (not including reattempts). The throughput and processor utilisation achieved is very near the target maximum desired operating levels of the system.

Implementation of such an algorithm will enable service providers confidently to deploy mass call-in services (such as televoting) while minimally impacting other subscribers and/or services.

It will be appreciated that various modifications and alterations may be made to the embodiment of the invention described above without departing from the scope or spirit of the present invention. For instance, different congestion detection trigger mechanisms and/or different control processes, such as window flow controls and automatic code gapping, may be utilised.

What is claimed is:

1. A method of controlling traffic through at least one node in an intelligent telecommunications network having a plurality of subsystems each of which provides subscriber services in response to requests from customers for the services, said method comprising the steps of:

continuously monitoring a moving average of a traffic profile for each subsystem at the node wherein the moving average of the traffic profile for a particular subsystem is monitored by:

counting the amount of requests for particular subscriber services received at the node within predetermined sequential monitoring time periods;

comparing the amount of requests for a particular subscriber service with the total number of requests for all subscriber services received at the node in each predetermined monitoring time period;

calculating an average of the amount of requests for particular subscriber services received over a plurality of the preceding monitoring time periods; and comparing the amount of requests for a particular subscriber service in a most recent or current monitoring time period with the average of the amount of requests for that particular subscriber service over said plurality of preceding monitoring time periods in order to determine whether or not a sudden change in the traffic profile for that subscriber service has occurred;

detecting when congestion occurs at the node;

determining from said moving average of the traffic profile whether the congestion is caused by a sudden change in the traffic profile for a particular subsystem at the node;

and invoking congestion controls to control congestion in the particular subsystem in which a sudden change in the traffic profile is determined.

2. A method of controlling traffic through at least one node in an intelligent telecommunications network having a plurality of subsystems each of which provides subscriber services in response to requests from customers for the services, said method comprising the steps of:

continuously monitoring a moving average of a traffic profile for each subsystem at the node;

storing a database of all dialed numbers of subscriber services available at the node or nodes;

compiling a focus list of dialed numbers of subscriber services determined as a potential focus of congestion and which may require congestion control, wherein, when an amount of requests for a particular dialed number of a subscriber service exceeds a threshold percentage or fraction of the total amount of requests in a predetermined time period, that particular dialed number is placed on the focus list;

detecting when congestion occurs at the node;

determining from said moving average of the traffic profile whether the congestion is caused by a sudden change in the traffic profile for a particular subsystem at the node; and invoking congestion controls to control congestion in the particular subsystem in which a sudden change in the traffic profile is determined.

3. The method according to claim 2 wherein, when an amount of requests for a particular dialed number of a subscriber service falls below a threshold percentage or fraction of the total amount of requests in a predetermined period, that particular dialed number is removed from the focus list.

4. The method of according to claim 2 wherein a particular dialed number of a subscriber service on the focus list is targeted for congestion control if the amount of requests for that dialed number in a most recent or current monitoring time period is higher than the average amount of requests for that dialed number over a plurality of preceding monitoring time periods.

5. The method according to claim 2 wherein a congestion control signal is sent from a service control point to a node when an overload of traffic is detected at the service control point.

6. The method according to claim 5 wherein processor utilization of a central processor unit at the service control point is monitored to determine whether an overload of traffic exists at the service control point.

7. The method according to claim 6 wherein the processor utilization is determined from the total number of requests for all subscriber services received at the service control point from the node or nodes connected to the service control point.

8. The method according to claim 5 wherein a congestion control signal is only sent from the service control point to a node when it is determined that there is an overload of traffic at the service control point.

9. The method according to claim 5 wherein a congestion control signal for a particular dialed number or sub scriber service is sent from the service control point to a node when a particular dialed number is on the focus list and targeted for congestion control and an overload of traffic exists at the service control point.

10. The method according to claim 5 comprising the further step of determining whether the overload of traffic at the service control point is a general overload or a focused overload or a particular subscriber or dialed number.

11. The method according to claim 10 wherein when it is determined that a general overload of traffic exists at the service control point, a general congestion control signal is sent from the service control point to the or each node connected to the service control point.

12. The method according to claim 2 wherein a central processor unit determines a congestion level for all dialed numbers on the focus list and a general congestion level for the service control point.

13. The method according to claim 12 wherein the congestion levels are updated at the end of each of a plurality of predetermined sequential time periods in which the amount of requests for subscriber services are counted.

14. The method according to claim 13 wherein when processor utilization is above an upper threshold level and there is a focused overload for a particular dialed number, the congestion level for that particular dialed number is incremented.

15. The method according to claim 14 wherein when the processor utilization is above the upper threshold level and no focused overload is detected, the general congestion level is incremented.

16. The method according to claim 14 wherein when the processor utilization is below a lower threshold level, all congestion levels are decremented.

17. The method according to claim 12 wherein congestion control is applied at a node by throttling or limiting the percentage or fraction of calls which are passed from the node to a service control point connected to the node.

18. The method according to claim 12 wherein congestion control for a particular dialed number or subscriber service at a node is applied by throttling or limiting a percentage or fraction of queries for that dialed number of subscriber service which are passed from the node to a service control point connected to the node.

19. The method according to claim 12 wherein the congestion levels are utilized in determining a percentage or fraction of calls or queries to be throttled or limited.

20. An apparatus for controlling traffic in an intelligent telecommunications network; said apparatus comprising:
   one or more nodes at which subscriber services are provided; and
   a service control means for monitoring a moving average of a traffic profile of requests for each subscriber service passing through the or each node and producing a congestion control signal for a node when a sudden change in the traffic profile of a particular subscriber causes congestion at the node, wherein the service control means comprises:
      a central processing unit (CPU) at a service control point connected to at least one node comprising a service switching point;
      counting means to count the amount of requests for each subscriber service received at the or each service switching point within predetermined sequential time periods;
      calculation means to calculate an average of the amount of requests for particular subscriber services received over a plurality of predetermined time periods, and;
      comparison means to compare the amount of requests for a particular subscriber service in a most recent predetermined time period with the average amount of requests for that particular subscriber service over a plurality of preceding predetermined time periods in order to determine whether a sudden change in the traffic profile for that particular subscriber service has occurred.

21. The apparatus according to claim 20 wherein the service control means comprises counting means to count the total amount of requests for all subscriber services in each predetermined sequential time period.

22. The apparatus according to claim 21 wherein the service control means comprises comparator means to compare the amount of requests for a particular subscriber service with the total amount of requests for all subscriber services in each predetermined sequential time period.

23. The apparatus according to claim 22 where the service control means places a particular dialed number of a subscriber service on a focus list when the amount of requests for that particular dialed number of the subscriber service exceeds a threshold percentage or fraction of the total amount of requests for all subscriber services in one of said predetermined sequential time periods.

24. The apparatus according to claim 23 wherein the service control means removes a particular dialed number of a subscriber service from the focus list when the amount of requests for that particular dialed number of the subscriber service in one of said predetermined sequential time periods is below a threshold percentage or fraction of the total amount of requests for all subscriber services in said period.

25. The apparatus according to claim 20 wherein the service control means includes a database of all dialed numbers for subscriber services available at the service switching points to which the service control point is connected.

26. The apparatus according to claim 20 wherein the service control means is programmed to compile a focus of dialed numbers of subscriber services each of which is determined as a potential focus of congestion which may require congestion control.

27. The apparatus according to claim 20 wherein said comparison means only compares the amount of requests for a particular dialed number of a subscriber service with the average amount of requests for that dialed number when the dialed number is present on a focus list.

28. The apparatus according to claim 27 wherein the service control means is programmed to target a particular dialed number on the focus list for congestion control when there is a sudden increase in the amount of requests for that dialed number in one of the predetermined time periods.

29. The apparatus according to claim 28 further comprising overload determination means to determine when an overload of traffic exists at the service control point.

30. The apparatus according to claim 29 further comprising congestion control signal generating means for generating congestion control signals when an overload of traffic is determined at the service control point.

31. The apparatus according to claim 30 wherein the congestion control signal generating means generates a focused congestion control signal for a particular dialed number when an overload of traffic is determined and the particular dialed number is on the focus list and targeted for congestion control.

32. The apparatus according to claim 31 wherein the congestion control signal generating means generates a general congestion control signal when an overload of traffic is determined at the service control point and there are no dialed numbers targeted for congestion control on the focus list.

33. The apparatus according to claim 29 wherein the service control means includes utilization monitoring means to monitor utilization of the central processor unit to determine whether an overload of traffic exists at the service control point.

34. A system for controlling traffic in an intelligent telecommunications network comprising a plurality of service switching points at which requests for subscriber services are received, and a service control point connected to said plurality of service switching points, said service switching points comprising:
   admission control means to apply congestion control at the service switching points in response to congestion control signals from the service control point, and
   the service control point comprises:
      signaling means to invoke the congestion control signals when congestion, caused by a sudden change in a traffic profile for at least one of the service switching points, is detected at the service control point, and;
      monitoring means to monitor a moving average of a traffic profile of requests for each subscriber service passing through at least one of the service switching points, wherein the monitoring means comprises:
         counting means to count the amount of requests for particular subscriber services received at the service switching point within predetermined sequential monitoring time periods;

comparison means to compare the amount of requests for a particular subscriber service with the total number of requests for all subscriber services received at the service switching point in each predetermined monitoring time period;

calculation means to calculate an average of the amount of requests for particular subscriber services received over a plurality of predetermined time periods, and;

comparison means to compare the amount of requests for a particular subscriber service in a most recent predetermined time period with the average amount of requests for that particular subscriber service over a plurality of preceding predetermined time periods in order to determine whether a sudden change in the traffic profile for that particular subscriber service has occurred.

35. The system according to claim 34 wherein the admission control means further comprises throttling means to throttle or limit the percentage or fraction of requests which are passed from the service switching point to the service control point.

* * * * *